US011878529B2

(12) United States Patent
Yamamoto

(10) Patent No.: US 11,878,529 B2
(45) Date of Patent: *Jan. 23, 2024

(54) LIQUID EJECTING DEVICE

(71) Applicant: BROTHER KOGYO KABUSHIKI KAISHA, Nagoya (JP)

(72) Inventor: Shinya Yamamoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,006

(22) Filed: Jan. 9, 2023

(65) Prior Publication Data

US 2023/0158798 A1 May 25, 2023

Related U.S. Application Data

(63) Continuation of application No. 17/464,946, filed on Sep. 2, 2021, now Pat. No. 11,577,515, which is a (Continued)

(30) Foreign Application Priority Data

Nov. 30, 2011 (JP) ................................ 2011-262893

(51) Int. Cl.
*B41J 2/165* (2006.01)
*B41J 2/175* (2006.01)
(Continued)

(52) U.S. Cl.
CPC ....... *B41J 2/16517* (2013.01); *B41J 2/16585* (2013.01); *B41J 2/175* (2013.01);
(Continued)

(58) Field of Classification Search
CPC ........ B41J 2/175; B41J 29/13; B41J 2/16585; B41J 2/1752; B41J 2/17553; B41J 2/1721;
(Continued)

(56) References Cited

U.S. PATENT DOCUMENTS 4,893,137 A 1/1990 Ebinuma
5,166,707 A 11/1992 Watanabe et al.
(Continued)

FOREIGN PATENT DOCUMENTS

CN 1784128 A 6/2006
CN 102145594 A 8/2011
(Continued)

OTHER PUBLICATIONS

United States Patent and Trademark Office, Office Action for U.S. Appl. No. 14/550,930, dated Apr. 16, 2015.
(Continued)

*Primary Examiner* — Thinh H Nguyen
(74) *Attorney, Agent, or Firm* — Baker Botts L.L.P.

(57) ABSTRACT

A first frame holds a platen. A second frame holds a head. When the second frame is at a first position, the head faces the platen. When the second frame is at a second position, the second frame is positioned farther away from the first frame than when the second frame is at the first position. At the second position, the head is positioned farther away from the platen than when the second frame is at the first position. A head lifter is held by the second frame. At the first position, the head lifter moves the head with respect to the second frame between a printing position and a separate position. At the printing position, the head ejects liquid toward a medium supported by the platen. At the separate position, the head is farther away from the platen in an intersecting direction than at the printing position.

11 Claims, 9 Drawing Sheets

Related U.S. Application Data continuation of application No. 17/101,395, filed on Nov. 23, 2020, now Pat. No. 11,345,153, which is a continuation of application No. 16/542,498, filed on Aug. 16, 2019, now Pat. No. 10,870,280, which is a continuation of application No. 16/190,674, filed on Nov. 14, 2018, now Pat. No. 10,384,453, which is a continuation of application No. 15/819,627, filed on Nov. 21, 2017, now Pat. No. 10,137,689, which is a continuation of application No. 15/592,858, filed on May 11, 2017, now Pat. No. 9,827,768, which is a continuation of application No. 15/173,949, filed on Jun. 6, 2016, now Pat. No. 9,649,866, which is a continuation of application No. 14/516,534, filed on Oct. 16, 2014, now Pat. No. 9,375,934, which is a continuation of application No. 14/043,712, filed on Oct. 1, 2013, now Pat. No. 8,882,248, which is a continuation of application No. 13/626,779, filed on Sep. 25, 2012, now Pat. No. 8,573,738.

(51) Int. Cl.

| | |
|---|---|
| ***B41J 29/13*** | (2006.01) |
| ***B41J 2/17*** | (2006.01) |
| ***B41J 29/02*** | (2006.01) |
| *B41J 29/17* | (2006.01) |
| *B41J 2/21* | (2006.01) |
| *B41J 2/145* | (2006.01) |

(52) U.S. Cl.
CPC ......... *B41J 2/1721* (2013.01); *B41J 2/17553* (2013.01); *B41J 29/02* (2013.01); *B41J 29/13* (2013.01); *B41J 2/145* (2013.01); *B41J 2/16535* (2013.01); *B41J 2/2114* (2013.01); *B41J 29/17* (2013.01)

(58) Field of Classification Search
CPC ........ B41J 2/17509; B41J 29/02; B41J 29/17; B41J 2/18; B41J 2/16535; B41J 2/16517; B41J 2/145; B41J 2/17513; B41J 2/2114
See application file for complete search history.

(56) References Cited

U.S. PATENT DOCUMENTS

| | | | | |
|---|---|---|---|---|
| 5,467,114 | A | 11/1995 | Ebinuma et al. | |
| 5,552,812 | A | 9/1996 | Ebinuma et al. | |
| 5,757,399 | A | 5/1998 | Murayama et al. | |
| 5,909,226 | A | 6/1999 | Takeda | |
| 6,039,431 | A | 3/2000 | Yui | |
| 6,190,010 | B1 | 2/2001 | Tanaka | |
| 6,443,645 | B1 | 9/2002 | Takei et al. | |
| 6,496,281 | B1 | 12/2002 | Yamamoto | |
| 6,739,692 | B2 | 5/2004 | Unosawa | |
| 7,334,861 | B2 | 2/2008 | Ha | |
| 7,448,737 | B2 | 11/2008 | Takagi | |
| 7,494,211 | B2 | 2/2009 | Murakami | |
| 7,572,989 | B2 | 8/2009 | Deshimaru | |
| 7,909,423 | B2 | 3/2011 | Saikawa et al. | |
| 7,959,268 | B2 | 6/2011 | Osawa et al. | |
| 8,016,412 | B2 | 9/2011 | Kawai et al. | |
| 8,057,022 | B2 | 11/2011 | Umeda | |
| 8,070,263 | B2 | 12/2011 | Oohashi et al. | |
| 8,220,797 | B2 | 7/2012 | Yamamoto et al. | |
| 8,277,027 | B2 | 10/2012 | Nakazawa | |
| 8,297,731 | B2 | 10/2012 | Ochiai et al. | |
| 8,520,269 | B2 | 8/2013 | Shibata | |
| 8,564,633 | B2 | 10/2013 | Matsushima et al. | |
| 8,573,378 | B2 | 11/2013 | Stauber | |
| 8,708,482 | B2 | 4/2014 | Yamamoto | |
| 8,740,347 | B2 | 6/2014 | Tanabe | |
| 8,767,065 | B2 | 7/2014 | Yamamoto | |
| 8,845,092 | B2 | 9/2014 | Yamamoto | |
| 8,857,955 | B2 | 10/2014 | Tamaki | |
| 8,919,936 | B2 | 12/2014 | Yamamoto | |
| 9,004,655 | B2 | 4/2015 | Tamaki | |
| 9,156,270 | B2 | 10/2015 | Yamamoto | |
| 9,375,936 | B2 | 6/2016 | Yamamoto | |
| 9,656,471 | B2 | 5/2017 | Tamaki | |
| 9,827,768 | B2 | 11/2017 | Yamamoto | |
| 11,577,515 | B2 * | 2/2023 | Yamamoto | B41J 2/175 |
| 2002/0024578 | A1 | 2/2002 | Yamashita | |
| 2005/0088493 | A1 | 4/2005 | Koga | |
| 2005/0185033 | A1 | 8/2005 | Miki | |
| 2005/0264601 | A1 | 12/2005 | Park | |
| 2006/0283695 | A1 | 12/2006 | Deshimaru | |
| 2007/0024682 | A1 | 2/2007 | Inoue | |
| 2007/0097172 | A1 | 5/2007 | Umeda | |
| 2007/0139506 | A1 | 6/2007 | Yonekawa | |
| 2007/0188580 | A1 | 8/2007 | Silverbrook | |
| 2007/0279888 | A1 | 12/2007 | Nanno et al. | |
| 2007/0285474 | A1 | 12/2007 | Murakami | |
| 2008/0049058 | A1 | 2/2008 | Yakura et al. | |
| 2008/0316282 | A1 | 12/2008 | Osawa et al. | |
| 2008/0316284 | A1 | 12/2008 | Osawa et al. | |
| 2009/0200735 | A1 | 8/2009 | Yamamoto | |
| 2009/0251512 | A1 | 10/2009 | Nozawa et al. | |
| 2010/0078877 | A1 | 4/2010 | Yamamoto et al. | |
| 2010/0079528 | A1 | 4/2010 | Yamamoto | |
| 2010/0214575 | A1 | 8/2010 | Murayama | |
| 2010/0302308 | A1 | 12/2010 | Matsura | |
| 2011/0102530 | A1 | 5/2011 | Yamamoto | |
| 2011/0115866 | A1 | 5/2011 | Izuma et al. | |
| 2011/0193927 | A1 | 8/2011 | Matsushima et al. | |
| 2011/0242180 | A1 | 10/2011 | Yamamoto | |
| 2012/0105524 | A1 | 5/2012 | Yamamoto | |
| 2012/0251166 | A1 | 10/2012 | Yamamoto et al. | |
| 2012/0300005 | A1 | 11/2012 | Sugimoto et al. | |
| 2013/0050381 | A1 | 2/2013 | Okumura et al. | |
| 2013/0106965 | A1 | 5/2013 | Yamamoto | |
| 2013/0106967 | A1 | 5/2013 | Yamamoto | |
| 2013/0106969 | A1 | 5/2013 | Yamamoto | |
| 2013/0135390 | A1 | 5/2013 | Yamamoto | |
| 2013/0135406 | A1 | 5/2013 | Yamamoto | |
| 2014/0036009 | A1 | 2/2014 | Tamaki | |
| 2015/0109388 | A1 | 4/2015 | Okuno et al. | |
| 2015/0165774 | A1 | 6/2015 | Yamamoto | |
| 2019/0275799 | A1 | 9/2019 | Shimazaki et al. | |

FOREIGN PATENT DOCUMENTS

| | | | |
|---|---|---|---|
| EP | 0271090 | A2 | 6/1988 |
| JP | H06-035244 | A | 2/1994 |
| JP | H11-078052 | A | 3/1999 |
| JP | 2001-341369 | A | 12/2001 |
| JP | 2002-052731 | A | 2/2002 |
| JP | 2003-094675 | A | 4/2003 |
| JP | 2003-103769 | A | 4/2003 |
| JP | 2004-216597 | A | 8/2004 |
| JP | 2004-306340 | A | 11/2004 |
| JP | 2004-345307 | A | 12/2004 |
| JP | 2005-022316 | A | 1/2005 |
| JP | 2005-022320 | A | 1/2005 |
| JP | 2005-081546 | A | 3/2005 |
| JP | 2005-088209 | A | 4/2005 |
| JP | 2005-125533 | A | 5/2005 |
| JP | 2006-212853 | A | 8/2006 |
| JP | 2007-069419 | A | 3/2007 |
| JP | 2007-125871 | A | 5/2007 |
| JP | 2007-326303 | A | 12/2007 |
| JP | 2008-009377 | A | 1/2008 |
| JP | 2008-230136 | A | 10/2008 |
| JP | 2008-268250 | A | 11/2008 |
| JP | 2009-023232 | A | 2/2009 |
| JP | 2009-101517 | A | 5/2009 |
| JP | 2009-178903 | A | 8/2009 |
| JP | 2010-149522 | A | 7/2010 |
| JP | 2010-188734 | A | 9/2010 |
| JP | 2010-260261 | A | 11/2010 |
| JP | 2010-274421 | A | 12/2010 |

(56) References Cited

FOREIGN PATENT DOCUMENTS

| | | |
|---|---|---|
| JP | 2011-037282 A | 2/2011 |
| JP | 2011-056963 A | 3/2011 |
| JP | 2011-126713 A | 6/2011 |

OTHER PUBLICATIONS

European Patent Office, European Search Report for European Patent Application No. 12186042.3, dated Dec. 21, 2012.
European Patent Office, European Search Report for European Patent Application No. 12186019.1, dated Dec. 21, 2012.
The State Intellectual Property Office of the People's Republic of China, Notification of First Office Action for Chinese Patent Application No. 201210427984.2, dated Jun. 10, 2014.
State Intellectual Property Office of the People's Republic of China, Notification of First Office Action for Chinese Patent Application No. 201210427368.7, dated Jul. 1, 2014.
United States Patent and Trademark Office; Notice of Allowance for U.S. Appl. No. 13/689,610, dated Dec. 9, 2013.
United States Patent and Trademark Office; First Notice of Allowance for U.S. Appl. No. 13/954,717, dated Jun. 6, 2014.
United States Patent and Trademark Office; Second Notice of Allowance for U.S. Appl. No. 13/954,717, dated Jun. 27, 2014.
United States Patent and Trademark Office; Third Notice of Allowance for U.S. Appl. No. 13/954,717, dated Jul. 9, 2014.
United States Patent and Trademark Office, Office Action for U.S. Appl. No. 14/446,962, dated Dec. 31, 2014.
United States Patent and Trademark Office, Office Action for U.S. Appl. No. 14/037,181, dated Mar. 21, 2014.
United States Patent and Trademark Office, Office Action issued for U.S. Appl. No. 14/203,495, dated Sep. 12, 2014.
United States Patent and Trademark Office, Notice of Allowance issued for U.S. Appl. No. 14/203,495, dated Apr. 14, 2015.
Japan Patent Office, Notification of Office Action for Japanese Patent Application No. 2012-239900, dated Dec. 15, 2015.
European Patent Office, European Search Report for European Patent Application No. 12185578.7 dated Mar. 21, 2013.
United States Patent and Trademark Office, Notice of Allowance issued in U.S. Appl. No. 14/550,930, dated Mar. 4, 2016.
Japan Patent Office, Office Action issued for Japanese Patent Application No. JP 2012-239901, dated Jan. 26, 2016.
Japan Patent Office, Office Action for Japanese Patent Application No. 2012-262063, dated Jan. 26, 2016.
Japan Patent Office, Office Action issued for Japanese Patent Application No. 2012-262062, dated Feb. 2, 2016.
Japan Patent Office, Office Action issued for Japanese Patent Application No. 2012-170628, dated Feb. 2, 2016.
United States Patent and Trademark Office, Non-Final Office Action issued for U.S. Appl. No. 13/954,819, dated Jun. 2, 2014.
United States Patent and Trademark Office, Office Action issued for U.S. Appl. No. 14/516,534, dated Apr. 3, 2015.
United States Patent and Trademark Office, Notice of Allowance issued for U.S. Appl. No. 14/516,534, dated Feb. 1, 2016.
United States Patent and Trademark Office, Notice of Allowance issued for U.S. Appl. No. 14/516,534, dated Mar. 1, 2016.
United States Patent and Trademark Office, Non-Final Office Action issued for U.S. Appl. No. 15/174,382, dated Aug. 16, 2016.
United States Patent and Trademark Office, Notice of Allowance issued for U.S. Appl. No. 15/174,382, dated Dec. 2, 2016.
United States Patent and Trademark Office; Notice of Allowance issued for U.S. Appl. No. 15/592,858, dated Jul. 26, 2017.
United States Patent and Trademark Office, Non-Final Office Action issued for U.S. Appl. No. 15/819,627, dated Jan. 12, 2018.
United States Patent and Trademark Office; Notice of Allowance issued for U.S. Appl. No. 15/819,627, dated Jul. 25, 2018.
United States Patent and Trademark Office; Notice of Allowance issued for U.S. Appl. No. 16/190,674, dated Jul. 10, 2019.
United States Patent and Trademark Office; Office Action issued for U.S. Appl. No. 16/542,498, dated May 14, 2020.
United States Patent and Trademark Office; Notice of Allowance issued for U.S. Appl. No. 16/542,498, dated Aug. 24, 2020.
United States Patent and Trademark Office; Notice of Allowance issued for U.S. Appl. No. 17/101,395, dated Jan. 28, 2022.
United States Patent and Trademark Office; Non-Final Office Action issued for U.S. Appl. No. 17/464,946, dated Sep. 16, 2022.
United States Patent and Trademark Office; Notice of Allowance issued for U.S. Appl. No. 17/464,946, dated Nov. 10, 2022.

* cited by examiner

LIQUID EJECTING DEVICE

REFERENCE TO RELATED APPLICATIONS

This application is a continuation of U.S. patent application Ser. No. 17/464,946 filed on Sep. 2, 2021; which is a continuation of U.S. patent application Ser. No. 17/101,395 filed on Nov. 23, 2020, now U.S. Pat. No. 11,345,153 B2 issued on May 31, 2022; which is a continuation of U.S. patent application Ser. No. 16/542,498 filed on Aug. 16, 2019, now U.S. Pat. No. 10,870,280 B2 issued on Dec. 22, 2020; which is a continuation of U.S. patent application Ser. No. 16/190,674 filed on Nov. 14, 2018, now U.S. Pat. No. 10,384,453 B2 issued on Aug. 20, 2019; which is a continuation of U.S. patent application Ser. No. 15/819,627 filed on Nov. 21, 2017, now U.S. Pat. No. 10,137,689 B2 issued on Nov. 27, 2018; which is a continuation of U.S. patent application Ser. No. 15/592,858 filed on May 11, 2017, now U.S. Pat. No. 9,827,768 B2 issued on Nov. 28, 2017; which is a continuation of U.S. patent application Ser. No. 15/173,949 filed on Jun. 6, 2016, now U.S. Pat. No. 9,649,866 B2 issued on May 16, 2017; which is a continuation of U.S. patent application Ser. No. 14/516,534 filed on Oct. 16, 2014, now U.S. Pat. No. 9,375,934 B2 issued on Jun. 28, 2016; which is a continuation of U.S. patent application Ser. No. 14/043,712 filed on Oct. 1, 2013, now U.S. Pat. No. 8,882,248 B2 issued on Nov. 11, 2014; which is a continuation of U.S. patent application Ser. No. 13/626,779 filed on Sep. 25, 2012, now U.S. Pat. No. 8,573,738 B2 issued on Nov. 5, 2013; which claims priority from Japanese Patent Application No. 2011-262893 filed on Nov. 30, 2011. The entire contents of each of which are incorporated herein by reference.

BACKGROUND ART

Technical Field

The invention relates to a liquid ejecting device that ejects liquid from ejection ports.

Background

A serial-type inkjet recording device is disclosed that conveys a recording medium while moving a recording head reciprocatingly in a direction perpendicular to a conveying direction of the recording medium, thereby recoding an image on the recording medium.

Generally, an inkjet recording device is designed such that pressure within a recording head is maintained within a predetermined negative pressure range relative to atmospheric pressure so as to prevent ink from leaking through ejection ports. As a method for achieving this, for example, a main tank and the recording head are connected with each other via a tube such that a liquid surface of the main tank (cartridge) is lower than an ejection surface.

An ink receiving section (a suction cap, a waste-ink receiving tray) for receiving ink ejected from the recording head is disposed in a maintenance region of the inkjet recording device, which is outside a print region. Generally, waste ink received by the ink receiving section is collected in a waste ink tank that is connected via a tube.

DESCRIPTION

Summary

In the above-described inkjet recording device, when a recording medium is jammed between the recording head and a platen, the jammed recording medium can be removed through an opening of a casing by moving the recording head out to the maintenance region. On the other hand, there exists a line-type inkjet recording device that records an image on a recording medium by using a recording head having a print region of approximately the same width as the recording medium for high-speed printing. If such a line-type recording head is adopted in the above-described recording head, high-speed printing can be performed.

However, the line-type recording head does not move during recording of an image. Hence, when a jam occurs, there is a need to move the recording head relative to the platen such that the recording head and the platen are spaced away from each other. Thus, the inventor considered, for example, splitting the casing into an upper casing and a lower casing such that the upper casing holds the recording head and the lower casing holds the platen. In this case, it is preferable that the main tank be located at a lower position than the recording head in order to keep pressure within recording head in a predetermined negative pressure range. Hence, it is preferable that the main tank be disposed at the lower casing. Then, if the upper casing is moved relative to the lower casing when a jam occurs, there is a possibility that a tube connecting the recording head with the main tank is pulled and strained and that the tube is damaged.

In view of the foregoing, it is an object of the invention to provide a liquid ejecting device that is capable of preventing damage at a liquid conveying section.

In order to attain the above and other objects, this specification discloses a printer. The printer includes a platen, a head, a first frame, a second frame, and a head lifter. The platen is configured to support a medium. The head includes an ejection surface at which an ejection port is opened. The ejection port is configured to eject liquid toward the medium supported by the platen. The first frame holds the platen. The second frame holds the head. The second frame is pivotally coupled with the first frame. The second frame is configured to be moved between a first position and a second position. When the second frame is at the first position, the head is configured to face the platen. When the second frame is at the second position, the second frame is positioned farther away from the first frame than when the second frame is at the first position. When the second frame is at the second position, the head is positioned farther away from the platen than when the second frame is at the first position. The head lifter is held by the second frame. When the second frame is at the first position, the head lifter configured to move the head with respect to the second frame between a printing position and a separate position. When the head is at the printing position, the head is configured to eject liquid toward the medium supported by the platen. When the head is at the separate position, the head is farther away from the platen in an intersecting direction intersecting the ejection surface than when the head is at the printing position.

BRIEF DESCRIPTION OF THE DRAWINGS

Embodiments in accordance with the invention will be described in detail with reference to the following figures wherein.

DETAILED DESCRIPTION

The schematic configuration of an inkjet-type printer 101 according to an embodiment of the invention will be described while referring to FIGS. 1 through 4.

Figure 1:
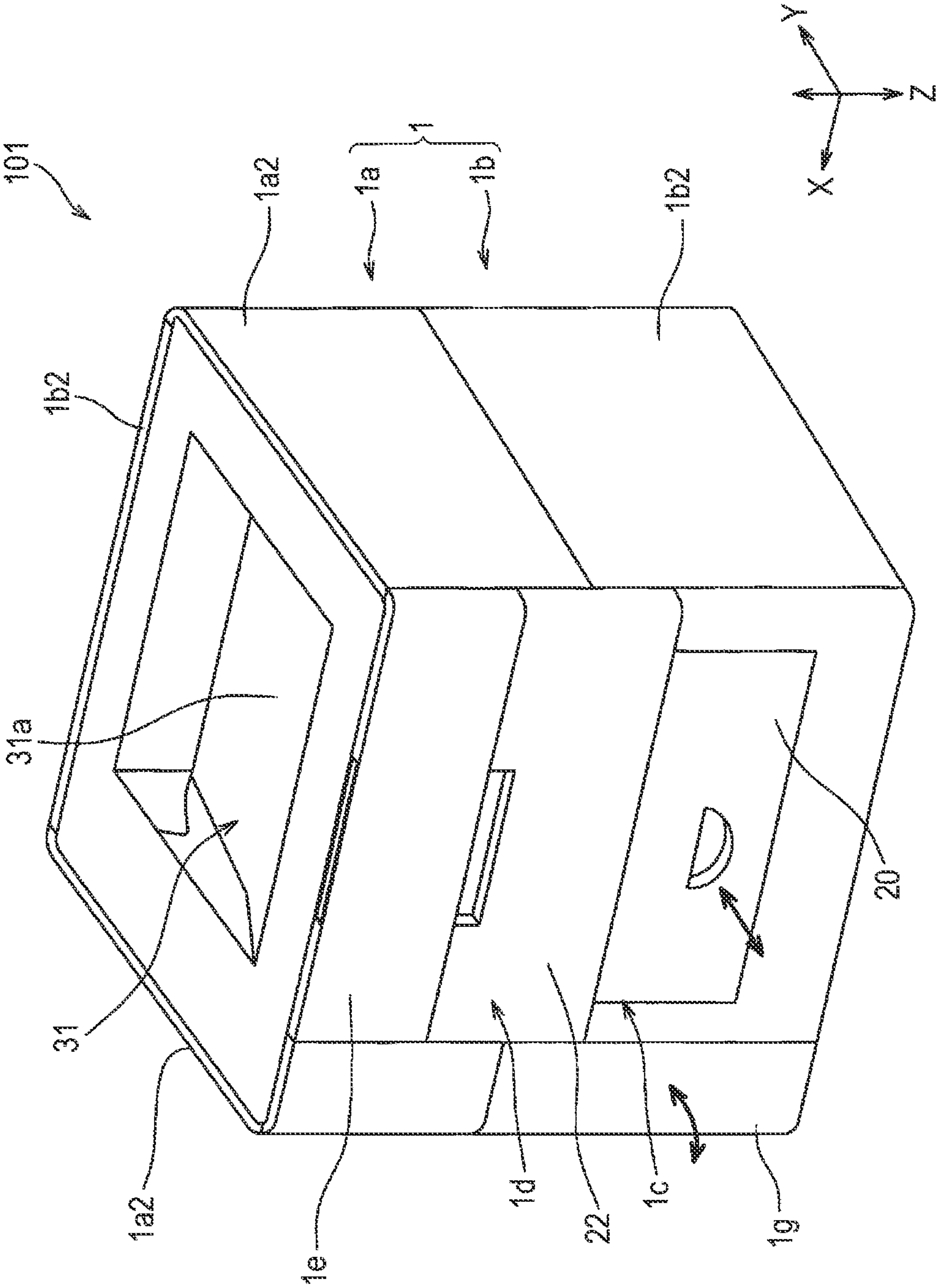
FIG. 1 is a perspective view showing the appearance of an inkjet-type printer according to an embodiment of the invention.

The printer 101 has an apparatus casing 1 including an upper casing 1*a* (first casing) and a lower casing 1*b* (second casing) both of which have a rectangular-parallelepiped shape and that have approximately the same size. The apparatus casing 1 is a rectangular-parallelepiped shape having six surfaces. Of the six surfaces of the apparatus casing 1, the side surface at the far side in a direction perpendicular to the drawing sheet of FIG. 1 is a rear surface, and the side surface at the near side in the direction perpendicular to the drawing sheet of FIG. 1 is a front surface. Of the surfaces connecting the rear surface and the front surface, the side surface at the far side in a direction perpendicular to the drawing sheet of FIG. 1 is a left surface, and the side surface at the near side in the direction perpendicular to the drawing sheet of FIG. 1 is a right surface. Of the surfaces connecting the rear surface and the front surface, the surface at the upper side in a vertical direction Z is an upper surface. Each of the rear surface and the front surface extends in the vertical direction Z and in a main scanning direction X. Each of the right surface and the left surface extends in the vertical direction Z and in a sub-scanning direction Y. The upper surface extends in the main scanning direction X and in the sub-scanning direction Y. The upper casing 1*a* has an opening at its lower side, and the lower casing 1*b* has an opening at its upper side. When the upper casing 1*a* lies on the lower casing 1*b* and the both openings are closed by each other, a space inside the printer 101 is defined (see FIG. 3).

A paper discharging section 31 (discharging section) is provided at the upper surface of the apparatus casing 1. As indicated by thick dashed arrows in FIG. 3, a conveying path along which paper P is conveyed is formed in a space defined by the upper casing 1*a* and the lower casing 1*b* (an internal space of the apparatus casing 1) from a first paper feeding section 1*c* and a second paper feeding section 1*d* to the paper discharging section 31.

Figure 4:
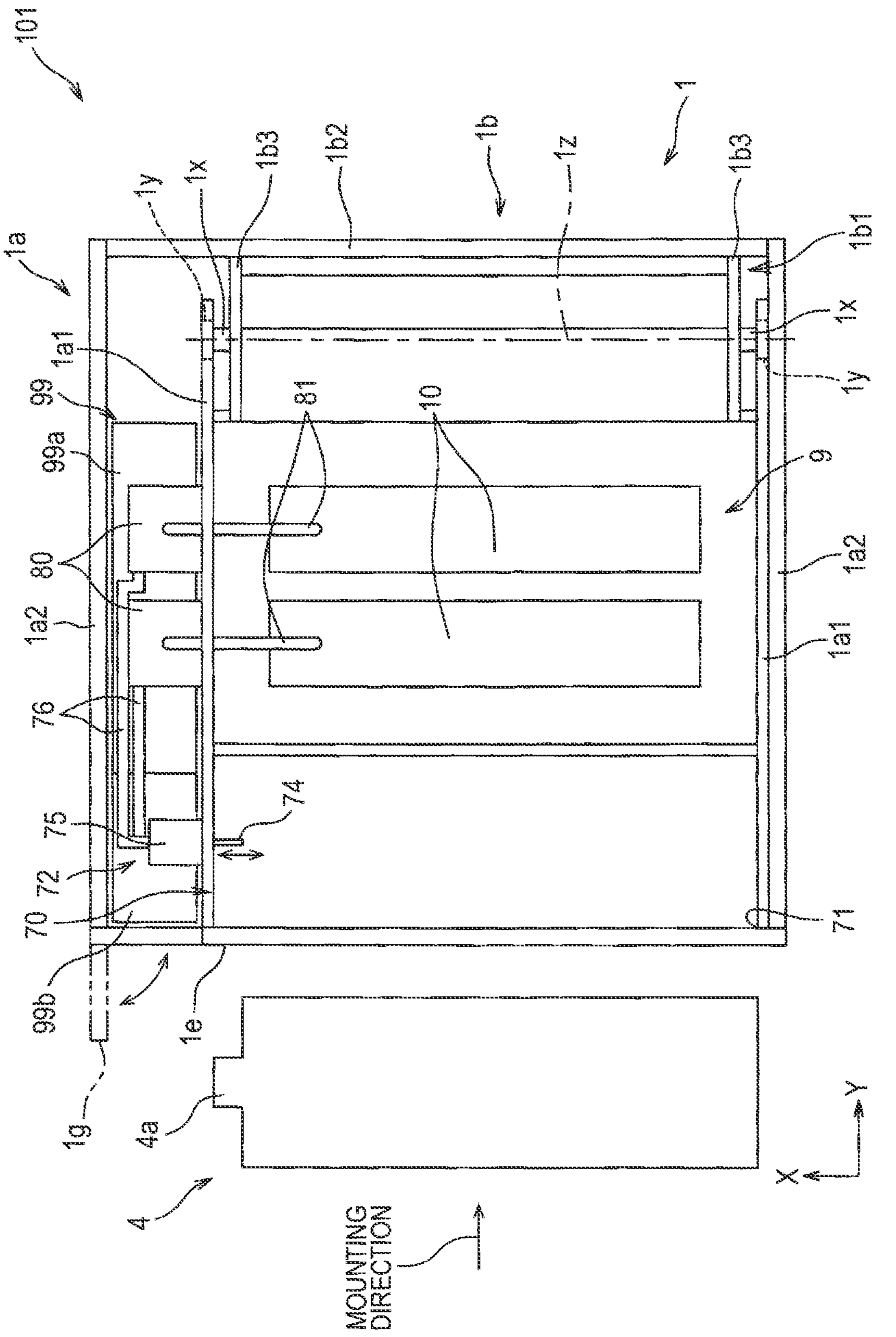
FIG. 4 is a schematic plan view showing the interior of the printer.

The upper casing 1*a* includes frames 1*a*1 (see FIG. 4) and panels 1*a*2 arranged outside the frames 1*a*1. The frames 1*a*1 include a pair of rigid frames confronting in the main scanning direction X and having high strength and a linking frame (not shown) that links the rigid frames. The lower casing 1*b* includes frames 1*b*1 (see FIGS. 2 and 4) and panels 1*b*2 arranged outside the frames 1*b*1. The frames 1*b*1 also include a pair of rigid frames confronting in the main scanning direction X and having high strength and a linking frame that links the rigid frames. As shown in FIGS. 5A and 5C, the pair of rigid frames of the frames 1*b*1 has an L-shape as viewed from the main scanning direction X. The pair of rigid frames has a pair of protruding sections 1*b*3 that protrudes upward from its rear side in the sub-scanning direction Y. That is, each of the rigid frames has the protruding section 1*b*3 that protrudes upward from its rear side. The frames 1*b*1 support a conveying mechanism 40 described later, and has the highest rigidity of all the frames. Note that, in FIG. 5C, the frame 1*a*1 of the upper casing 1*a* and the frame 1*b*1 of the lower casing 1*b* are shown in bold lines for illustration purposes.

The apparatus casing 1 has a shaft 1*x* extending in the main scanning direction X. As shown in FIG. 3, the shaft 1*x* is located near one end (the right end in FIG. 3) of the upper casing 1*a* in the sub-scanning direction Y and at approximately a center of the upper casing 1*a* in the vertical direction Z. That is, the shaft 1*x* is disposed at a position closer to the rear surface of the apparatus casing 1 than to the front surface of the apparatus casing 1. The upper casing 1*a* is linked to the lower casing 1*b* via the shaft 1*x*. The upper casing 1*a* can be pivotally moved, about an axis 1*z* of the shaft 1*x*, relative to the lower casing 1*b*. With pivotal movement, the upper casing 1*a* can take both an adjacent position at which the upper casing 1*a* is adjacent to the lower casing 1*b* (first position: the position shown in FIGS. 1 and 3) and a spaced position at which the upper casing 1*a* is farther spaced away from the lower casing 1*b* than at the adjacent position (second position: the position shown in FIG. 2). At the spaced position, a distance between an ejection surface 10*a* of a head 10 described later and platens 44 and 45 is larger than the corresponding distance at the adjacent position. When the upper casing 1*a* is at the spaced position, a part of the paper conveying path formed by the upper casing 1*a* and the lower casing 1*b* at the adjacent position is exposed to the outside, and a work space for a user is secured on the paper conveying path. The user can use the work space to manually perform a jam process (an operation of removing a jam of paper P on the conveying path) from the front side of the apparatus casing 1. That is, a jam process can be performed by "front access". Note that, in the apparatus casing 1, of the two surfaces confronting in the sub-scanning direction Y (the surfaces extending in the vertical direction Z and in the main scanning direction X), the surface farther from the axis 1*z* is the front surface, and the surface closer to the axis 1*z* is the rear surface.

The shaft 1*x* is formed to protrude outward in the main scanning direction X at each of the pair of protruding sections 1*b*3 (see FIGS. 4, 5A, and 5C) that protrudes upward in the frames 1*b*1 of the lower casing 1*b*. The shaft 1*x* extends in the main scanning direction X, and its axial direction is in parallel with the main scanning direction X. As shown in FIG. 4, bearings 1*y* for rotatably supporting the shaft 1*x* are provided at the frames 1*a*1 of the upper casing 1*a*. The upper casing 1*a* and the lower casing 1*b* are pivotally coupled by the shaft 1*x* and the bearings 1*y*.

The shaft 1*x* is provided with a spring (not shown) that urges the upper casing 1*a* in such a direction that the upper casing 1*a* is opened (from the adjacent position toward the spaced position). In the present embodiment, the upper casing 1*a* can open up to a predetermined angle with respect to a horizontal surface. That is, the upper casing 1*a* can open until an angle θ made by the upper casing 1*a* and the lower casing 1*b* reaches the predetermined angle. The predetermined angle is such an angle that the user can put his or her hand between the upper casing 1*a* and the lower casing 1*b* for a jam process, and is 29° (degrees) in the present embodiment.

Figure 2:
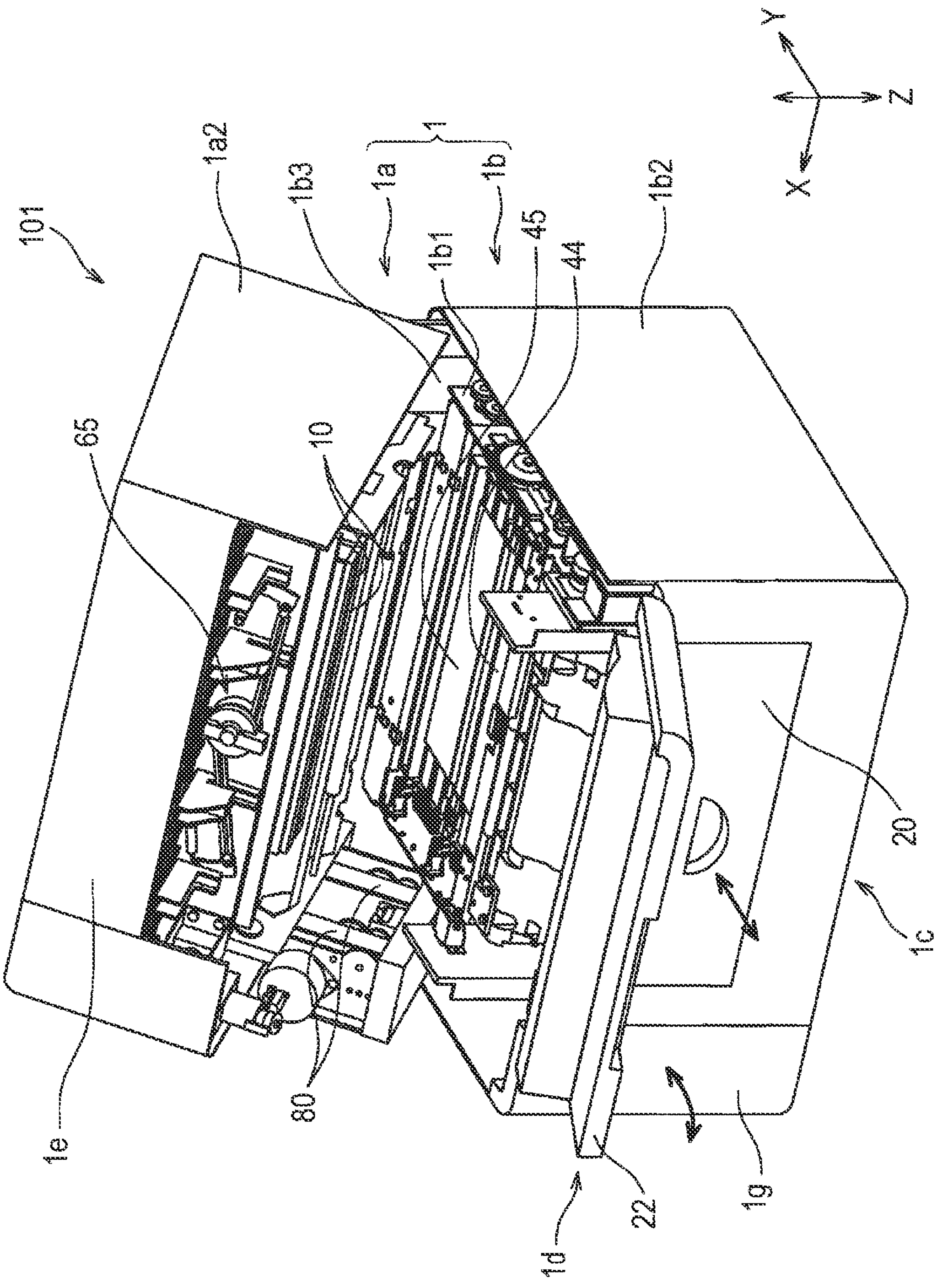
FIG. 2 is a perspective view showing the appearance of the printer in a state where an upper casing of the printer is pivotally moved relative to a lower casing and is disposed in a spaced position.
Figure 3:
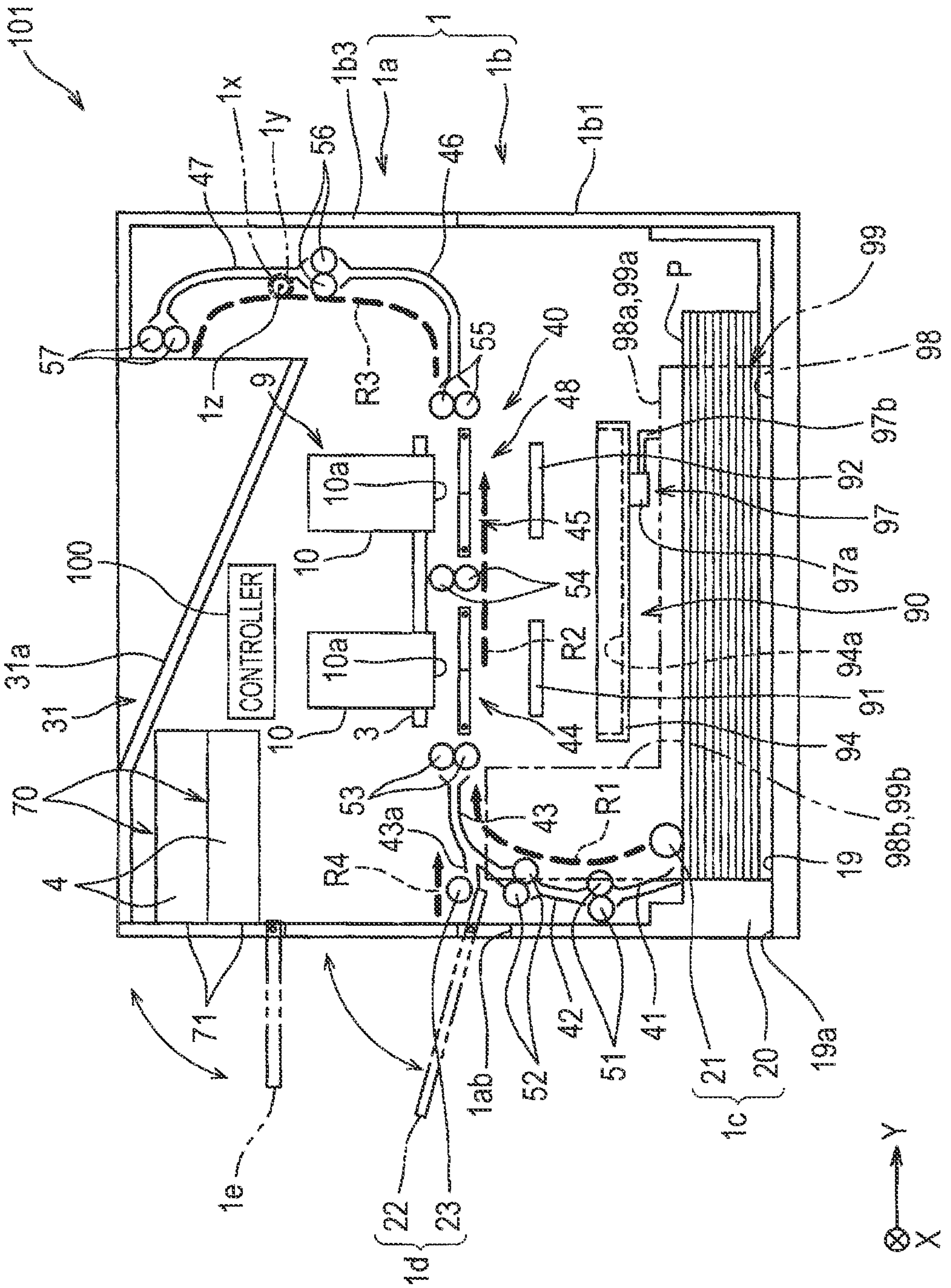
FIG. 3 is a schematic side view showing the interior of the printer.

As shown in FIG. 2, a lock mechanism 65 is provided at the front surface of the upper casing 1*a* (the surface at the left near-side surface in FIGS. 1 and 2), for restricting movement of the upper casing 1*a* located at the adjacent position. A door 22 straddling the upper and lower casings 1*a* and 1*b* and capable of opening and closing is provided at the front surface of the apparatus casing 1. The door 22 is configured to partially cover the front surface of the apparatus casing 1 in a closed state. By opening the door 22, the lock mechanism 65 is exposed. By releasing restriction performed by the lock mechanism 65, the upper casing 1*a* can be pivotally moved relative to the lower casing 1*b*. Further, when the upper casing 1*a* at the spaced position is returned to the adjacent position, the lock mechanism 65 automatically restricts movement of the upper casing 1*a*. Note that the door 22 also functions as a manual-feed tray 22 of the second paper feeding section 1*d* as will be described later.

Next, various elements arranged in the internal space of the printer 101 will be described while referring to FIGS. 3 through 5C etc.

Figure 7:
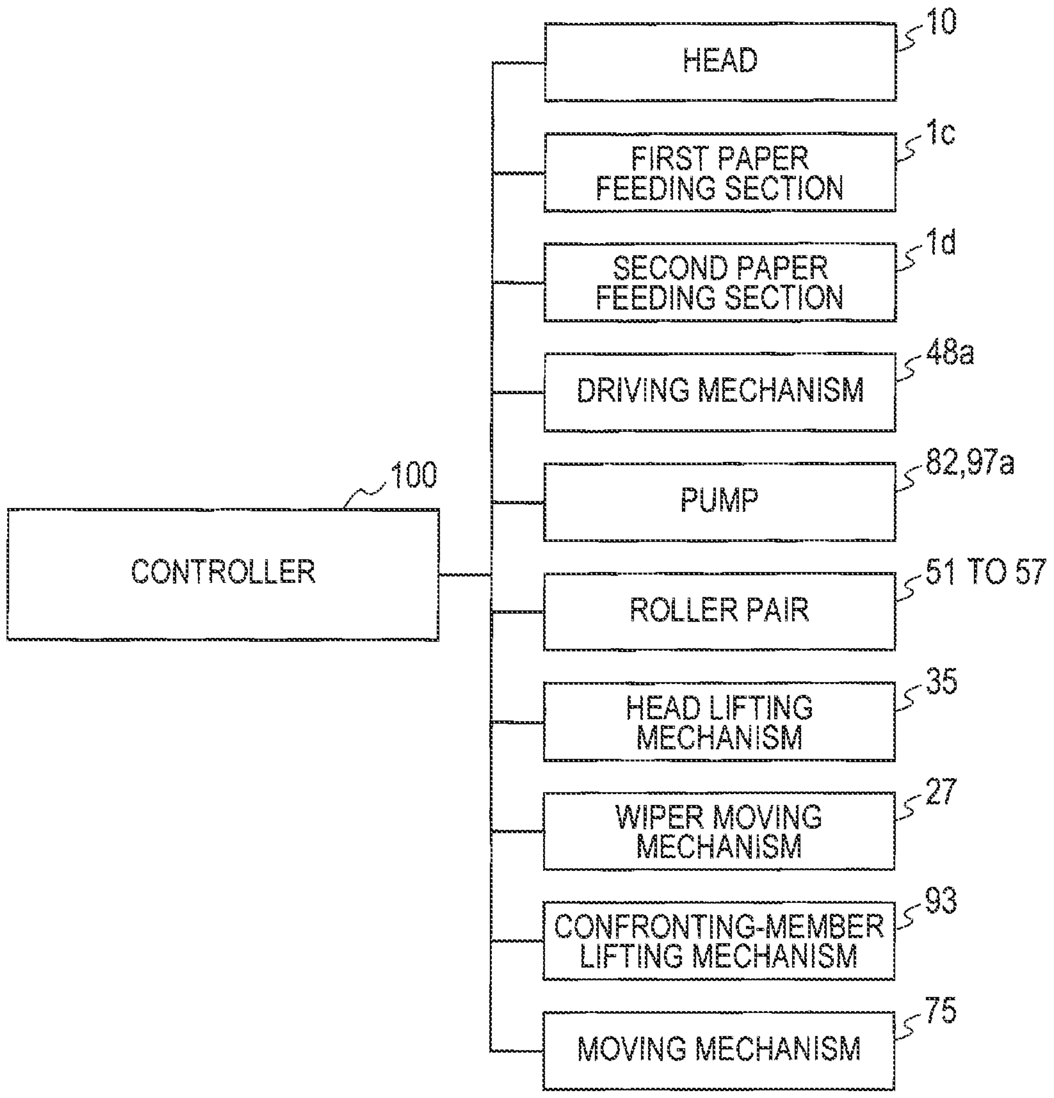
FIG. 7 is a block diagram showing a configuration for controlling the printer shown in FIG. 1.
Figure 8A:
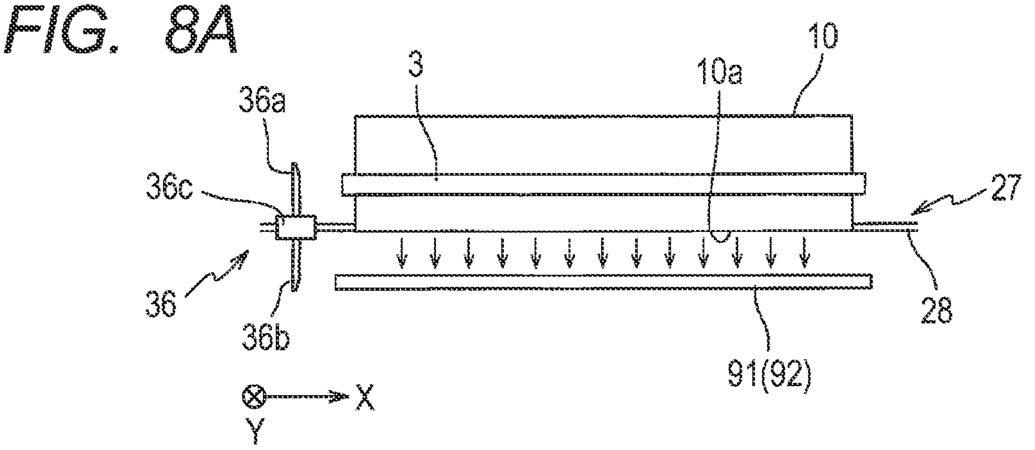
FIGS. 8A, 8B and 8C are schematic views for illustrating first and second wiping operations.
Figure 8B:
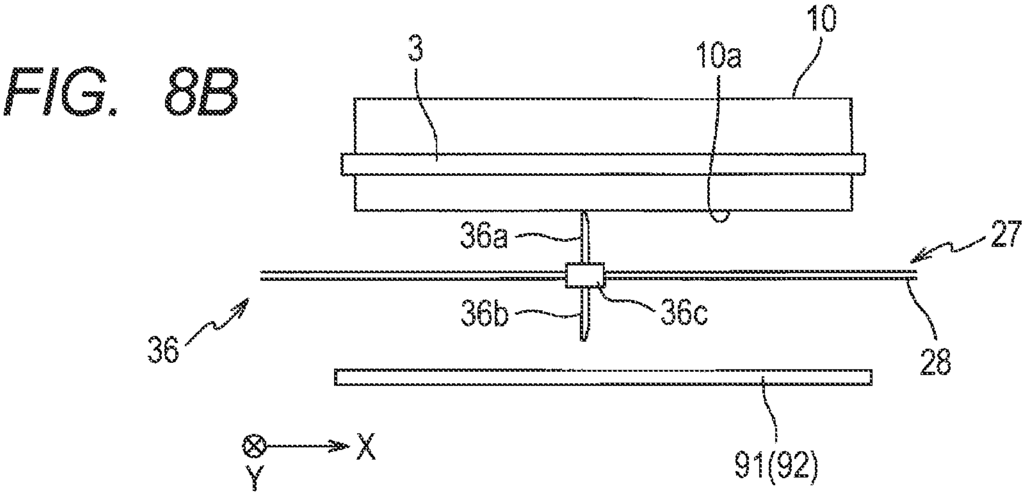
Figure 8C:
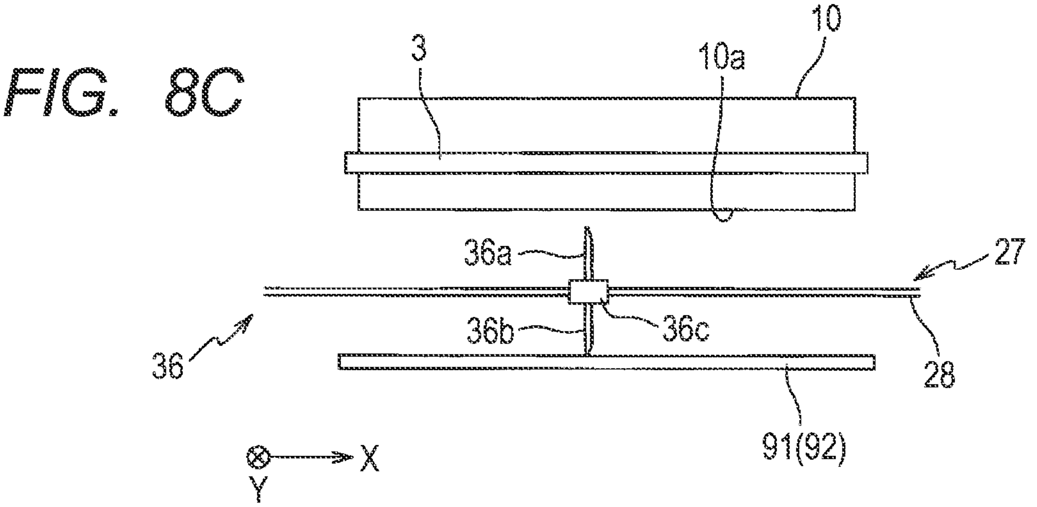

As shown in FIG. 3, the apparatus casing 1 accommodates, in its internal space, a controller 100 that controls various sections of the printer 101, the conveying mechanism 40 that defines the conveying path of paper P, a supporting mechanism 48 (supporting section), a head unit 9, a head lifting mechanism 35 (see FIG. 7), a liquid conveying section 72 (see FIG. 4), two cartridges 4 (first tank), two cartridge mount sections 70, the first paper feeding section 1*c*, the second paper feeding section 1*d*, a liquid receiving section 90, a waste-liquid tank 99, a waste-liquid-tank mount section 98, a waste-liquid conveying section 97, and a wiper unit 36 (see FIGS. 8A through 8C). Of these, the controller 100, the head unit 9, the head lifting mechanism 35, the liquid conveying section 72, the two cartridges 4, and the cartridge mount sections 70 are provided at the upper casing 1*a*. The conveying mechanism 40, the supporting mechanism 48, the first paper feeding section 1*c*, the second paper feeding section 1*d*, the liquid receiving section 90, the waste-liquid tank 99, the waste-liquid-tank mount section 98, the waste-liquid conveying section 97, and the wiper unit 36 are provided at the lower casing 1*b*.

The conveying path defined by the conveying mechanism 40 includes paths R1, R2, and R3 used for normal conveying, and a path R4 connecting the second paper feeding section 1*d* with the path R1. The conveying mechanism 40 includes elements defining the path R1 through R4 to be described later and a conveying motor (not shown). The conveying mechanism 40 is supported by the frames 1*b*1. The elements defining the path R3 are supported by the pair of protruding sections 1*b*3 of the frames 1*b*1.

The path R1 (curved path) is a path that is curved in a U-shape as viewed from the main scanning direction X and that leads from the first paper feeding section 1*c* to a recording position (a position between the ejection surface 10*a* and the platens 44, 45). The path R1 is defined by guides 41 through 43 and roller pairs 51 through 53. The path R1 is a path for conveying paper P accommodated in a paper feed tray 20 from the rear side to the front side and subsequently conveying the paper P to the rear side in a U-turn at the front side of the apparatus casing 1.

The path R2 is a path that passes through respective recording positions of the two heads 10, and that is defined by the platens 44 and 45 in confrontation with the respective ejection surfaces 10*a* of the two heads 10 and by a pair of rollers 54. The path R2 is a path for conveying paper P from the front side toward the rear side.

Figure 6A:
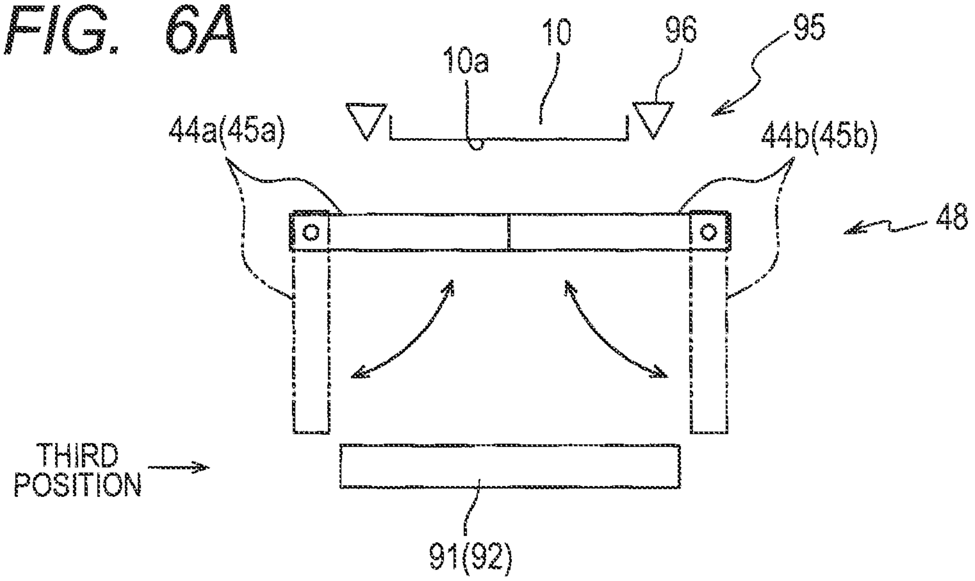
FIGS. 6A, 6B and 6C are schematic views for illustrating operations of a supporting mechanism and a confronting member.
Figure 6B:
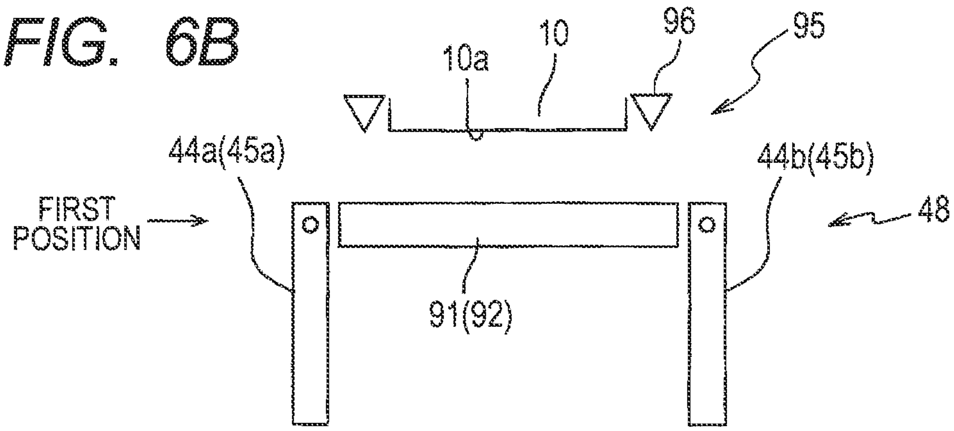

Here, the supporting mechanism 48 having the two platens 44 and 45 will be described. The supporting mechanism 48 supports, from the underside, paper P that is conveyed during recording. The platen 44 has divided platens 44*a* and 44*b* that are divided into two pieces. Similarly, the platen 45 has divided platens 45*a* and 45*b* that are divided into two pieces. The supporting mechanism 48 has a driving mechanism 48*a* (platen moving mechanism) (see FIG. 7) for pivotally moving each of the divided platens 44*a*, 44*b*, 45*a*, and 45*b*. Each of the divided platens 44*a*, 44*b*, 45*a*, and 45*b* has a pivotal axis extending in the main scanning direction X. Each of the divided platens 44*a* and 45*a* at the upstream side in the conveying direction has a pivotal center at their upstream ends in the conveying direction. Each of the divided platens 44*b* and 45*b* at the downstream side in the conveying direction has a pivotal center at their downstream ends in the conveying direction. Here, the conveying direction is a direction in which paper P is conveyed along the path R2. The controller 100 controls the driving mechanism 48*a* to drive each of the platens 44 and 45 (the divided platens 44*a*, 44*b*, 45*a*, and 45*b*) to pivotally move between a supporting-surface forming position (confronting position) and an open position (retracted position). At the supporting-surface forming position, as shown in FIGS. 3 and 6A, the free ends of the divided platens 44*a* and 44*b* abut each other, and the divided platens 44*a* and 44*b* form a planar supporting surface. Similarly, at the supporting-surface forming position, the free ends of the divided platens 45*a* and 45*b* abut each other, and the divided platens 45*a* and 45*b* form a planar supporting surface. These supporting surfaces confront the respective ejection surfaces 10*a*. At the open position, as shown in FIG. 6B, each of the divided platens 44*a*, 44*b*, 45*a*, and 45*b* is pivotally moved 90 degrees, and each free end hangs down. And, the upper surfaces of the divided platens 44*a* and 44*b* confront each other and extend in parallel with each other. Similarly, the upper surfaces of the divided platens 45*a* and 45*b* confront each other and extend in parallel with each other. That is, the platens 44 and 45 do not confront the respective ejection surfaces 10*a*. Thus, the ejection surfaces 10*a* confront confronting members 91 and 92 with a space therebetween. When the platens 44 and 45 are at the open position, the confronting members 91 and 92 can move upward and downward. Note that the two platens 44 and 45 are located at the supporting-surface forming position during a recording operation, and are located at the open position during a maintenance operation.

The path R3 is a path that is curved in a U-shape, as viewed from the main scanning direction X, leading from the recording position to the paper discharging section 31, and that is defined by guides 46 and 47 and pairs of rollers 55 through 57. The path R3 is a path for conveying paper P having passed through the path R2 from the front side to the rear side and subsequently conveying the paper P to the front side in a U-turn at the rear side of the apparatus casing 1. The path R3 is located farther upward than the recording position, and is curved in the opposite direction from the path R1. That is, as shown in FIG. 3, the path R1 is curved to be convex toward the front side (the left side in FIG. 3) near the front surface of the apparatus casing 1, whereas the path R3 is curved to be convex toward the rear side (the right side in FIG. 3) near the rear surface of the apparatus casing 1. Thus, when viewed in a direction perpendicular to the drawing sheet of FIG. 3 (toward the far side), the paths R1 through R3 are formed in a reversed S-shape, as a whole.

The path R4 is a path leading from the second paper feeding section 1*d* to a middle part of the path R1, and is defined by a divergence guide 43*a* diverged from the guide 43. Each of the roller pairs 51 through 57 includes a drive roller that is connected with a conveying motor and a follow roller that rotates following rotation of the drive roller.

As shown in FIG. 3, the paper discharging section 31 is provided at the upper surface of the upper casing 1*a*. The paper discharging section 31 has a supporting surface 31*a* that supports discharged paper P. The supporting surface 31*a* is slanted downward toward the shaft 1*x* in the sub-scanning direction Y. Paper P discharged to the paper discharging section 31 slides downward along a slant of the supporting surface 31*a*, and the upstream end of the paper P in the conveying direction abuts a wall surface of the paper discharging section 31 at the upstream side in the conveying direction. Thus, paper P discharged to the paper discharging section 31 is aligned. Note that, because the supporting surface 31*a* is slanted, the size of the paper discharging section 31 in the sub-scanning direction Y can be reduced.

The rear end of the supporting surface 31*a* is located between the cartridge mount sections 70 and the ejection surfaces 10*a* with respect to the vertical direction Z. Further, a part of the supporting surface 31*a* at the front side overlaps a part of the cartridge mount sections 70 at the rear side in the vertical direction Z. With this configuration, the cartridge mount sections 70 can be arranged in a dead space between the supporting surface 31*a* of the upper casing 1*a* and the heads 10, the dead space being formed by the slant of the supporting surface 31*a*. This contributes to downsizing of the printer 101.

The head unit 9 includes the two heads 10 and a carriage 3 that supports the heads 10. The two heads 10 include a precoat head that ejects pretreatment liquid and an inkjet head that ejects black ink, which are arranged in this order from the upstream side in the conveying direction of paper P.

Each head 10 has the same structure, and is a line-type head that is elongated in the main scanning direction X, and has an outer shape of substantially a rectangular-parallelepiped. The heads 10 are fixed to the carriage 3, while being spaced away from each other in the sub-scanning direction Y (a direction perpendicular to the main scanning direction X and to the vertical direction Z). The carriage 3 is supported by the frames 1*a*1 of the upper casing 1*a*, such that the carriage 3 can move up and down.

The lower surface of the head 10 serves as the ejection surface 10*a* in which a large number of ejection ports are formed. Liquid channels are formed within the head 10 for allowing pretreatment liquid or black ink (hereinafter, collectively referred to as "liquid") supplied from the cartridge 4 to flow to the ejection ports. Here, pretreatment liquid is a liquid having a function of preventing spread and strike-through of ink, a function of improving color production performance and quick-drying performance of ink, and the like. In FIG. 3, the ejection surface 10*a* is a surface in parallel with a horizontal surface.

As shown in FIGS. 3 and 4, the two cartridge mount sections 70 (first tank mount section) are provided between the two frames 1*a*1 of the upper casing 1*a*, while being arranged in the vertical direction Z adjacent to each other. The cartridge mount sections 70 are arranged at a higher position than the heads 10 with respect to the vertical direction Z (see FIGS. 5A and 5B). With this configuration, liquid can be supplied naturally from the mounted cartridges 4 to subsidiary tanks 80 (described later).

The cartridge mount sections 70 define spaces to which the respective cartridges 4 are mounted. As shown in FIG. 4, each cartridge mount section 70 extends to be elongated in the main scanning direction X, like the head 10. Further, the cartridge mount sections 70 (and the mounted cartridges 4) are arranged to be aligned with the heads 10 in the sub-scanning direction Y, as viewed from the vertical direction Z. The cartridge mount sections 70 are arranged at positions closer to the front side than the heads 10 are. Because the cartridge mount sections 70 are arranged in this configuration, although the heads 10 elongated in the main scanning direction X are adopted, the space within the upper casing 1*a* can be utilized effectively. Hence, the upper casing 1*a* can be downsized in the main scanning direction X, which suppresses an increase in the size of the printer 101 in a plan view (i.e., footprint). Further, as shown in FIG. 3, the cartridge mount sections 70 overlap the path R1 in the vertical direction Z. With this configuration, the size of the printer 101 in a plan view can be reduced.

A mount opening 71 of each cartridge mount section 70 is formed in the front surface of the upper casing 1*a*. A door 1*e* (see FIG. 1) for opening and closing the mount openings 71 is provided at the upper casing 1*a*. The door 1*e* is a plate-shaped member that is pivotally supported by the upper casing 1*a*. As indicated by the double-dot chain lines in FIG. 3, the mount openings 71 are exposed by pivotally moving the door 1*e*. Through the mount openings 71, the cartridges 4 are mounted on the cartridge mount sections 70. By inserting and removing the cartridges 4 through the mount openings 71, the cartridges 4 can be replaced. The mounting direction of the cartridges 4 is a direction in parallel with the sub-scanning direction Y, and is a direction from the front side toward the rear side.

The liquid conveying section 72 includes a hollow needle 74, a moving mechanism 75 that moves the hollow needle 74, pipes 76 and 81, and the subsidiary tank 80. The liquid conveying section 72 connects the cartridge 4 mounted on the cartridge mount section 70 with the head 10. The subsidiary tank 80 is provided with a pump 82 (see FIG. 7). The liquid conveying section 72 is provided for each of the cartridge mount sections 70. The hollow needle 74 and the moving mechanism 75 are arranged at one end side (the upper side in FIG. 4) of the cartridge mount section 70 in the main scanning direction X, such that the hollow needle 74 and the moving mechanism 75 are aligned with the cartridge mount section 70 (and the mounted cartridge 4) in the main scanning direction X. The pipe 76 connects the hollow needle 74 with the subsidiary tank 80. In the present embodiment, liquid is replenished naturally from the mounted cartridge 4 to the subsidiary tank 80. However, a pump may be provided between the hollow needle 74 and the subsidiary tank 80. If the pump is provided, the pump performs replenishment of liquid from the mounted cartridge 4 to the subsidiary tank 80. If the pump is provided, for example, it may be so configured that, when a liquid amount within the subsidiary tank 80 becomes less than or equal to a predetermined amount, the pump replenishes the subsidiary tank 80 with a predetermined amount of liquid from the cartridge 4. Alternatively, the pump may replenish the subsidiary tank 80 with liquid from the cartridge 4, such that the liquid amount within the subsidiary tank 80 is always a predetermined amount.

The controller 100 controls the moving mechanism 75 to move the hollow needle 74 in the main scanning direction X between a connection position and a separation position. At the connection position, the hollow needle 74 protrudes into the cartridge mount section 70 so as to connect the cartridge 4 mounted on the cartridge mount section 70 with the liquid conveying section 72. At the separation position, the hollow needle 74 does not protrude into the cartridge mount section 70 so as to be separated from the cartridge 4 mounted on the cartridge mount section 70. A mounting operation of the cartridge 4 is performed in a state where the hollow needle 74 is at the separation position. Further, in a state where the hollow needle 74 is at the separation position, the cartridges 4 are removed and inserted so as to perform replacement of the cartridge 4.

As shown in FIG. 4, the cartridge 4 has substantially a rectangular-parallelepiped shape that is elongated in the main scanning direction X in a state where the cartridge 4 is mounted on the cartridge mount section 70. Liquid is filled inside the cartridge 4. A liquid supplying section 4*a* (connection section) protruding in the main scanning direction X is provided at one end (the upper in FIG. 4) of the cartridge 4 in the main scanning direction X. A spout made of rubber is provided at a tip end surface of the liquid supplying section 4*a*. After the cartridge 4 is mounted on the cartridge mount section 70, the controller 100 controls the moving mechanism 75 to move the hollow needle 74 from the separation position to the connection position, so that the hollow needle 74 penetrates the spout. With this operation, liquid within the cartridge 4 is supplied to the subsidiary tank 80 through the hollow needle 74 and the pipe 76. The liquid supplying section 4*a* is located at the subsidiary tank 80 side, with respect to the main scanning direction X. With this configuration, the length of the pipe 76 of the liquid conveying section 72 can be shortened (that is, a distance of conveying liquid can be shortened). Because the length of the pipe 76 is short, air does not tend to enter liquid through the pipe 76. If air enter liquid, there is a possibility that ejection malfunction occurs.

The two subsidiary tanks 80 are tanks that temporarily store liquid supplied from the respective cartridges 4. As shown in FIG. 4, the subsidiary tanks 80 are arranged to be aligned with the respective heads 10 in the main scanning direction X as viewed from the vertical direction Z, and are arranged at positions closer to the left surface of the upper casing 1*a* than the heads 10 are. The subsidiary tank 80 and the head 10 are arranged to partially overlap each other in the main scanning direction X (see FIGS. 5A and 5B). The subsidiary tanks 80 are arranged at one end side (the upper in FIG. 4) of the heads 10 in the main scanning direction X. The subsidiary tanks 80 are supported by the frame 1*a*1 between the frame 1*a*1 and the panel 1*a*2. Further, the subsidiary tanks 80 are supported by the frame 1*a*1, such that the inner liquid surface is within a predetermined level range that is lower than the ejection surface 10*a*. With this configuration, pressure within the head 10 is negative pressure, and liquid does not tend to leak from the ejection ports. The pipes 81 connect the subsidiary tanks 80 and the respective heads 10. The subsidiary tanks 80 are supported by the frame 1*a*1, such that the inner liquid surface is within the predetermined level range that is lower than the ejection surface 10*a* even when the upper casing 1*a* is at the spaced position. Hence, even if the upper casing 1*a* moves between the spaced position and the adjacent position, pressure within the head 10 is kept at negative pressure, and liquid does not tend to leak from the ejection ports.

Each subsidiary tank 80 is provided with the pump 82 (see FIG. 7). The controller 100 controls each pump 82 to forcefully send liquid within the subsidiary tank 80 to the head 10. Note that the pump 82 may be omitted. In a case where the pump 82 is not provided, it may be so configured that, as liquid is ejected from the head 10, liquid is supplied to the head 10 from the subsidiary tank 80. More specifically, as liquid is ejected from the head 10, pressure within the head 10 becomes negative pressure. Because pressure within the head 10 becomes negative pressure, the head 10 sucks liquid from the subsidiary tank 80. Thus, liquid is supplied to the head 10 from the subsidiary tank 80.

The head lifting mechanism 35 (see FIG. 7) moves the carriage 3 up and down so that the head 10 moves between a print position and a retracted position. At the print position (see FIGS. 3 and 8A), the ejection surfaces 10*a* and the platens 44 and 45 located at the supporting-surface forming position confront each other with a space suitable for printing therebetween. At the print position, the head 10 is located at the lower end in the moving range. At the retracted position (see FIG. 8C), the ejection surfaces 10*a* and the platens 44 and 45 located at the supporting-surface forming position are spaced farther away from each other than at the print position. That is, at the retracted position, the head 10 is located at a higher position than at the print position. At the retracted position, the head 10 is located at the upper end in the moving range. A wiping position (see FIG. 8B) is located between the print position and the retracted position. At the wiping position and at the retracted position, wipers 36*a* and 36*b* (described later) can move in a space between the head 10 and the confronting member 91, 92 (described later).

The wiper unit 36 is provided for each of the heads 10. The wiper unit 36 includes the two wipers 36*a* and 36*b*, a base section 36*c*, and a wiper moving mechanism 27. The wiper 36*a* is provided to stand at the upper side of the base section 36*c* for wiping the ejection surface 10*a* (first wiping operation). The wiper 36*b* is provided to stand at the lower side of the base section 36*c* for wiping the surface of the confronting member 91, 92 (second wiping operation). The wiper moving mechanism 27 includes a pair of guides 28 (only one guide 28 is shown in FIGS. 8A-8C) and a driving motor (not shown). When the driving motor is driven, the base section 36*c* moves reciprocatingly along the guides 28. As shown in FIG. 8A, a standby position of the base section 36*c* is adjacent to the left end of the head 10. In each wiping operation, the wiper 36*a* or 36*b* wipes the surface while moving rightward in FIG. 8B or 8C. The base section 36*c* returns to the standby position in a state where the head 10 is at the retracted position and where the confronting member 91, 92 is at a third position (FIG. 6A; described later). Note that the two wiper units 36 for the respective heads 10 can be driven independently.

Returning to FIG. 3, the liquid receiving section 90 includes the two confronting members 91 and 92, a confronting-member lifting mechanism 93 (see FIG. 7), and a waste-liquid tray 94. Each of the confronting members 91 and 92 is a glass plate having a rectangular shape that is slightly larger than the ejection surface 10*a* in a plan view. The confronting members 91 and 92 are arranged between the ejection surfaces 10*a* and a paper-feed-tray mount section 19 with respect to the vertical direction Z. Further, the confronting members 91 and 92 are arranged to overlap the respective ejection surfaces 10*a* in the vertical direction Z. The confronting members 91 and 92 are provided for receiving liquid ejected from the ejection surfaces 10*a* during a purging operation described later. The confronting members 91 and 92 also constitute a cap mechanism 95 (described later) in cooperation with an annular member 96 (described later).

Figure 6C:
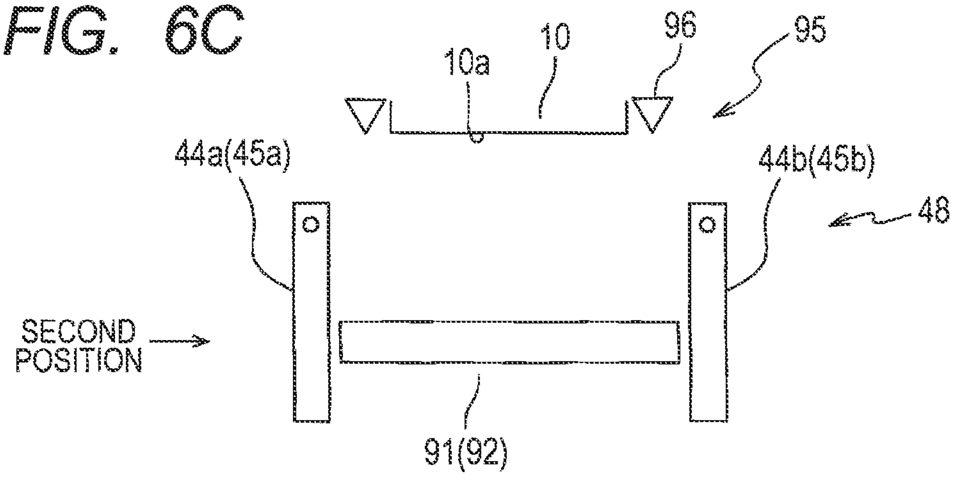

The confronting-member lifting mechanism 93 moves the confronting member 91, 92 up and down. The confronting-member lifting mechanism 93 drives the confronting member 91, 92 up and down between first and third positions. As shown in FIG. 6B, the first position (receiving position) is a position where the confronting member 91, 92 is the closest to the ejection surface 10*a*. A purging operation is performed in a state where the confronting member 91, 92 is located at the first position and where the head 10 is located at the print position. In a state where the confronting member 91, 92 is located at the first position and where the head 10 is located at the print position, the distance between the surface of the confronting member 91, 92 and the ejection surface 10*a* is the same as the distance between the surface of the platen 44, 45 and the ejection surface 10*a* during printing. At a second position, as shown in FIG. 6C, the distance between the surface of the confronting member 91, 92 and the ejection surface 10*a* is larger than the corresponding distance at the first position. The wiper 36*b* wipes the confronting member 91, 92 in a state where the confronting member 91, 92 is located at the second position. At the third position (standby position), as shown in FIG. 6A, the distance between the surface of the confronting member 91, 92 and the ejection surface 10*a* is larger than the corresponding distance at the second position. When the confronting member 91, 92 is located at the third position, the confronting member 91, 92 does not make contact with the wiper 36*b*. Note that the third position is a standby position of the confronting members 91 and 92 during printing. Not only the platens 44 and 45 but also the confronting members 91 and 92 are arranged between the ejection surfaces 10*a* and the paper-feed-tray mount section 19. The platens 44 and 45 and the confronting members 91 and 92 are arranged in a dead space between the ejection surfaces 10*a* and the paper-feed-tray mount section 19, the dead space being formed by forming the path R1. Further, because the confronting members 91 and 92 move in the vertical direction Z, the size of the printer 101 in a plan view does not increase. Hence, the footprint of the printer 101 can be made small.

The waste-liquid tray 94 has a concave section 94*a*. The waste-liquid tray 94 is disposed between the confronting members 91 and 92 and the paper-feed-tray mount section 19 with respect to the vertical direction Z. The waste-liquid tray 94 is disposed to overlap the confronting members 91 and 92 and the paper-feed-tray mount section 19 in the vertical direction Z. Further, the waste-liquid tray 94 is disposed to overlap the confronting members 91 and 92 in the vertical direction Z. With this configuration, the waste-liquid tray 94 receives liquid that drips from the confronting members 91 and 92 in the purging operation, and receives liquid that is wiped off from the confronting members 91 and 92 by the wiper 36*b* in the second wiping operation.

The waste-liquid conveying section 97 has a pump 97*a* and a pipe 97*b* connecting the pump 97*a* with the waste-liquid tank 99. The pump 97*a* is provided at a bottom section of the waste-liquid tray 94. The controller 100 controls the pump 97*a* to discharge liquid stored in the concave section 94*a*, via the pipe 97*b*, to the waste-liquid tank 99 mounted on the waste-liquid-tank mount section 98.

Figure 5B:
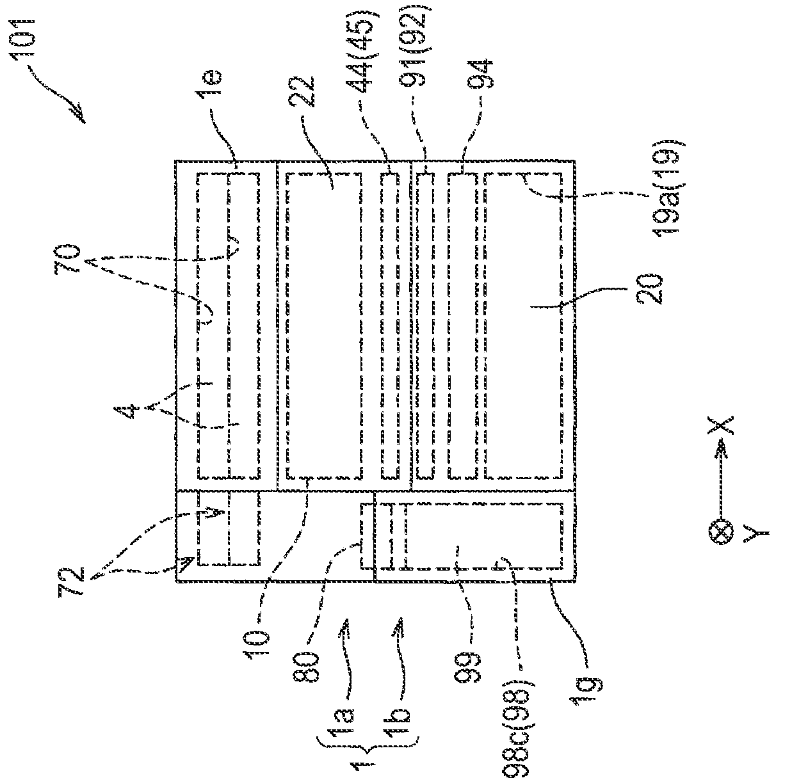
FIG. 5B is a schematic front view of the printer.
Figure 5A:
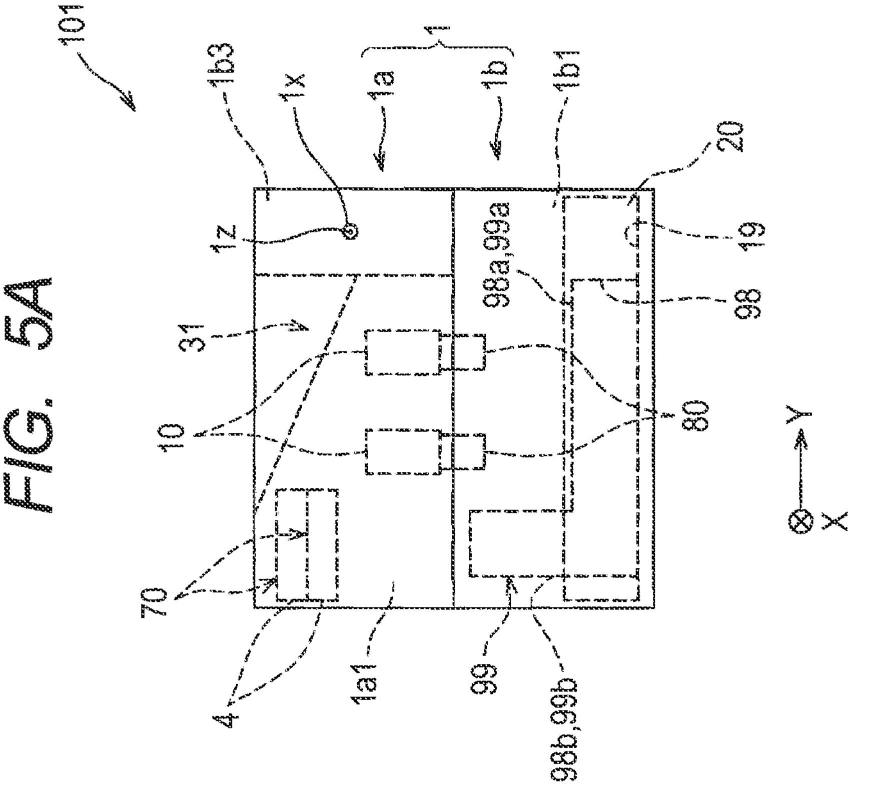
FIG. 5A is a schematic side view of the printer.
Figure 5C:
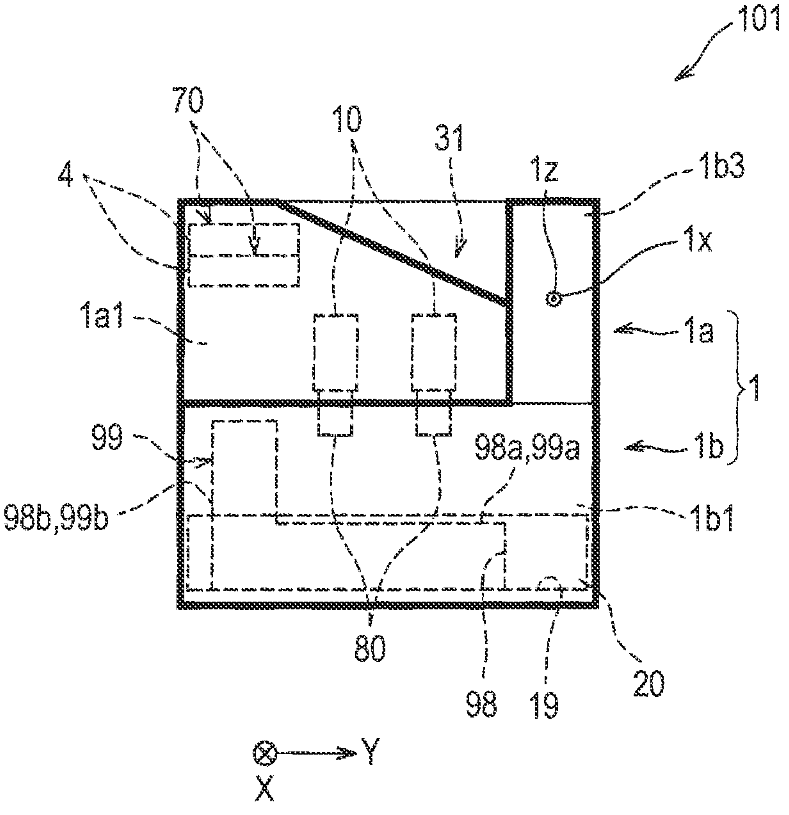
FIG. 5C is a schematic side view of the printer for particularly showing frames of the upper and lower casings.

As shown in FIGS. 3, 4, and 5B, the waste-liquid-tank mount section 98 is disposed at a position below the liquid conveying section 72 and at a side (the upper side in FIG. 4) of the liquid receiving section 90 in the main scanning direction X. In other words, the waste-liquid tank 99 and the liquid receiving section 90 are arranged in the main scanning direction X. The waste-liquid-tank mount section 98 is for defining a space to which the waste-liquid tank 99 is mounted. A mount opening 98*c* of the waste-liquid-tank mount section 98 is formed in the front surface of the lower casing 1*b*. A door 1*g* is provided at the lower casing 1*b* for opening/closing the mount opening 98*c*. The door 1*g* is a plate-shaped member that is pivotally supported by the lower casing 1*b*. By pivotally moving the door 1*g* in the direction of the arrow in FIG. 1, the mount opening 98*c* is exposed. The waste-liquid tank 99 is mounted on the waste-liquid-tank mount section 98 through the mount opening 98*c*. The waste-liquid tank 99 can be inserted and removed through the mount opening 98*c* for replacing the waste-liquid tank 99. The mounting direction of the waste-liquid tank 99 is the same as the mounting direction of the cartridges 4.

The waste-liquid-tank mount section 98 has a horizontal section 98*a* and a vertical section 98*b*, and has an L-shape as viewed from the main scanning direction X. The horizontal section 98*a* is an elongated section that extends in the sub-scanning direction Y. The vertical section 98*b* is formed to protrude upward from the front side of the horizontal section 98*a*. With respect to the vertical direction Z, the vertical section 98*b* overlaps the moving mechanism 75, and the horizontal section 98*a* overlaps the subsidiary tanks 80. The subsidiary tanks 80 are arranged at positions overlapping the waste-liquid-tank mount section 98 in this way. With this configuration, the waste-liquid tank 99 mounted on the waste-liquid-tank mount section 98 and the subsidiary tanks 80 also overlap each other in the vertical direction Z. With this configuration, an increase in the size of the printer 101 in a plan view can be suppressed. Further, because the waste-liquid tank 99 and the moving mechanism 75 also overlap each other in the vertical direction Z, an increase in the size of the printer 101 in a plan view can be further suppressed.

The waste-liquid tank 99 has a horizontal section 99*a* (extending section) and a vertical section 99*b* (protruding section), and has an L-shape as viewed from the main scanning direction X, like the waste-liquid-tank mount section 98. The horizontal section 99*a* is a part that is disposed at the horizontal section 98*a* when the waste-liquid tank 99 is mounted on the waste-liquid-tank mount section 98. The horizontal section 99*a* is elongated in the sub-scanning direction Y. The vertical section 99*b* is formed to protrude upward from the front end of the horizontal section 99*a*. The vertical section 99*b* is a part that is disposed at the vertical section 98*b* when the waste-liquid tank 99 is mounted on the waste-liquid-tank mount section 98. The vertical section 99*b* of the waste-liquid tank 99 overlaps the subsidiary tanks 80 in the sub-scanning direction Y when the upper casing 1*a* is at the adjacent position (see FIGS. 4 and 5A). With this configuration, the subsidiary tanks 80 can be arranged in a dead space located above the horizontal section 99*a* of the waste-liquid tank 99, and an increase in height of the printer 101 can be suppressed. Further, due to the L-shape structure of the waste-liquid tank 99, the capacity of the waste-liquid tank 99 can be increased while utilizing the dead space within the printer 101. The waste-liquid tank 99 is connected with the pipe 97*b* of the waste-liquid conveying section 97 via a connection mechanism (not shown) when the waste-liquid tank 99 is mounted on the waste-liquid-tank mount section 98. Note that an air vent port is provided at a top part of the vertical section 99*b* for venting air when liquid flows into the waste-liquid tank 99 and for venting liquid vapor to reduce the amount of liquid in the waste-liquid tank 99.

As modifications, the waste-liquid tray 94, the waste-liquid conveying section 97, and the waste-liquid tank 99 may be provided separately for each head 10. Further, the inside of the waste-liquid tray 94 and the waste-liquid tank 99 may be divided (for example, a partition is provided inside the concave section 94*a* of the waste-liquid tray 94 and inside the waste-liquid tank 99, so that the inside of the waste-liquid tray 94 and the waste-liquid tank 99 are divided). With this configuration, pretreatment liquid and ink are not mixed easily, and condensation can be suppressed.

As shown in FIG. 3, the first paper feeding section 1*c* is disposed below the paper discharging section 31, the head unit 9, the platens 44 and 45, and the liquid receiving section 90, and overlaps these components in the vertical direction Z. Hence, the paths R1 through R3 are formed in a reversed S-shape as described above, and the size of the printer 101 in a plan view is made small. As a result, the footprint of the printer 101 can be made small. The first paper feeding section 1*c* has the paper feed tray 20, a paper feed roller 21, and the paper-feed-tray mount section 19 on which the paper feed tray 20 is mounted.

As shown in FIGS. 3, 5A, and 5B, the paper-feed-tray mount section 19 defines a space to which the paper feed tray 20 is mounted, and extends in the sub-scanning direction Y. A mount opening 19*a* (first opening) of the paper-feed-tray mount section 19 is formed in the front surface of the lower casing 1*b*. As shown in FIG. 3, the paper feed tray 20 is mounted on the paper-feed-tray mount section 19 through the mount opening 19*a*. The paper-feed-tray mount section 19 and the waste-liquid-tank mount section 98 are arranged in the main scanning direction X. Similarly, the paper feed tray 20 and the waste-liquid tank 99 are also arranged in the main scanning direction X. With this configuration, the height of the printer 101 can be reduced. The mounting direction of the paper feed tray 20 is the same as the mounting direction of the waste-liquid tank 99 and the cartridges 4. The paper feed tray 20 is a box opened upward and can accommodate paper P. The controller 100 controls the paper feed roller 21 to rotate and send out paper P that is located at the uppermost position in the paper feed tray 20.

The second paper feeding section 1*d* has the manual-feed tray 22 (the door 22) and a paper feed roller 23, and is configured to feed paper to a middle part of the path R1. The manual-feed tray 22 that can be opened/closed is provided at the front surface of the apparatus casing 1. The manual-feed tray 22 is a plate-shaped member that is pivotally supported by the lower casing 1*b*. The manual-feed tray 22 is pivotable between: a close position at which the manual-feed tray 22 closes an opening lab (FIG. 3) formed in the front surface of the apparatus casing 1 (the position shown in FIG. 1); and an open position at which the manual-feed tray 22 opens the opening lab (the position shown in FIG. 2). Normally (when the second paper feeding section 1*d* is not used), the manual-feed tray 22 is located at the close position so as to cover the opening lab. That is, when the manual-feed tray 22 closes the opening lab, the manual-feed tray 22 constitutes a part of the front surface of the apparatus casing 1. When the manual-feed tray 22 closing the opening lab is pivotally moved to the open position as shown in FIG. 2, the second paper feeding section 1*d* becomes a usable state. Paper P in predetermined sizes is placed on the manual-feed tray 22 when the manual-feed tray 22 is located at the open position, and the controller 100 controls the paper feed roller 23 to rotate. With this operation, paper P on the manual-feed tray 22 is conveyed from the path R4 via the path R1 to the path R2. Because the manual-feed tray 22 is also provided at the front surface of the apparatus casing 1 as described above, an operation of placing paper P on the manual-feed tray 22 can also be accessed from the front.

Next, the controller 100 will be described. The controller 100 includes a CPU (Central Processing Unit) serving as an arithmetic processing unit, as well as a ROM (Read Only Memory), a RAM (Random Access Memory: including a non-volatile RAM), an ASIC (Application Specific Integrated Circuit), an I/F (Interface), and I/O (Input/Output Port), and the like. The ROM stores programs executed by the CPU, various fixed data, and the like. The RAM temporarily stores data (image data etc.) that are necessary when programs are executed. The ASIC performs rewriting, rearrangement, etc of image data (for example, signal processing and image processing). The I/F performs transmission and reception of data with an external device. The I/O performs input/output of detection signals of various sensors.

The controller 100 controls operations of each section of the printer 101 and governs overall operations of the printer 101. The controller 100 controls a recording operation based on a print command (image data etc.) supplied from an external device (a PC etc. connected with the printer 101). Upon receiving the print command, the controller 100 drives the first paper feeding section 1*c* (or the second paper feeding section 1*d*) and the roller pairs 51 through 57. Paper P sent out from the first paper feeding section 1*c* is conveyed along the paths R1 and R2. Paper P sent out from the second paper feeding section 1*d* is conveyed from the path R4 via the path R1 to the path R2. When paper P sequentially passes positions directly below the heads 10 (recording positions) while being supported on the platens 44 and 45, the controller 100 controls each head 10 to drive and eject liquid from ejection ports of the ejection surface 10*a* toward paper P. In this way, an image is formed on paper P. After that, paper P is conveyed along the path R3 and is discharged onto the paper discharging section 31.

The controller 100 controls maintenance operations such as recovery of liquid ejecting characteristics of the heads 10. The maintenance operations include a purging operation, a first wiping operation for the ejection surface 10*a*, a second wiping operation for the confronting member 91, 92, and the like.

Here, an example of the maintenance operation will be described with reference to FIGS. 8A through 8C.

Upon receiving a maintenance signal, the controller 100 controls the purging operation. The controller 100 controls the supporting mechanism 48 such that the platen 44, 45 (the divided platens 44*a*, 44*b*, 45*a*, 45*b*) takes the open position and, subsequently, as shown in FIG. 8A, controls the confronting-member lifting mechanism 93 such that confronting member 91, 92 takes the first position. After that, the controller 100 controls the pump 82 to supply liquid to the head 10 with pressure (the purging operation). At the purging operation of the present embodiment, a predetermined amount of liquid in the cartridge 4 is forcefully sent to the head 10 so that liquid is discharged from the ejection ports.

Next, the first wiping operation is performed. At this time, the controller 100 controls the head lifting mechanism 35 such that the head 10 takes the wiping position, and controls the confronting-member lifting mechanism 93 such that the confronting member 91, 92 takes the third position. After that, as shown in FIG. 8B, the controller 100 controls the wiper unit 36 (the wiper moving mechanism 27) to wipe the ejection surface 10*a* with the wiper 36*a* (the first wiping operation). After the first wiping operation, the controller 100 controls the head lifting mechanism 35 such that the head 10 takes the retracted position and, subsequently, controls the wiper unit 36 to return the base section 36*c* (the wipers 36*a* and 36*b*) to the standby position.

Next, the second wiping operation is performed. The controller 100 controls the confronting-member lifting mechanism 93 such that the confronting member 91, 92 takes the second position. After that, as shown in FIG. 8C, the controller 100 controls the wiper unit 36 (the wiper moving mechanism 27) to wipe the surface of the confronting member 91, 92 with the wiper 36*b* (the second wiping operation). After the second wiping operation, the controller 100 controls the confronting-member lifting mechanism 93 such that the confronting member 91, 92 takes the third position and, subsequently, controls the wiper unit 36 to return the base section 36*c* (the wipers 36*a* and 36*b*) to the standby position. Further, at this time, the controller 100 drives the pump 97*a* of the waste-liquid conveying section 97 to discharge, to the waste-liquid tank 99, liquid stored in the waste-liquid tray 94 as a result of the purging operation and the first and second wiping operations.

Next, the controller 100 controls the head lifting mechanism 35 such that the head 10 takes the print position. After that, the cap mechanism 95 seals a space facing the ejection surface 10*a* from the external space, so that the head 10 becomes a standby state. Then, the maintenance operation ends.

The cap mechanism 95 includes the confronting member 91, 92 and the annular member 96 (schematically shown in FIGS. 6A through 6C). The annular member 96 is provided at the periphery of each head 10 and is configured to be moved up and down by a moving mechanism (not shown). In order to seal the space facing the ejection surface 10*a* from the external space, the confronting member 91, 92 is moved to the first position, and the annular member 96 is moved down so as to seal the space facing the ejection surface 10*a* in cooperation with the confronting member 91, 92.

As described above, according to the printer 101 of the present embodiment, even when the upper casing 1*a* is pivotally moved (relatively moved) with respect to the lower casing 1*b* such that the upper casing 1*a* takes the spaced position, the heads 10, the cartridges 4, and the liquid conveying sections 72 move together with the upper casing 1*a* as a unit. Hence, the pipes 76 and 81 of the liquid conveying sections 72 are not pulled and strained, and thus are not damaged easily. Further, because the liquid receiving section 90, the waste-liquid tank 99, and the waste-liquid conveying section 97 are arranged at the lower casing 1*b*, the pipe 97*b* of the waste-liquid conveying section 97 is not pulled and strained, and thus is not damaged easily, either.

While the invention has been described in detail with reference to the above aspects thereof, it would be apparent to those skilled in the art that various changes and modifications may be made therein without departing from the scope of the claims.

For example, the upper casing 1*a* and the lower casing 1*b* may be coupled with each other such that the upper casing 1*a* can slide relative to the lower casing 1*b*, and that the upper casing 1*a* can take an adjacent position and a spaced position. That is, other configurations may be adopted, as long as the upper casing 1*a* is coupled with the lower casing 1*b* such that the upper casing 1*a* can move relative to the lower casing 1*b*.

It is not necessary that the waste-liquid tank 99 and the liquid receiving section 90 be arranged in the main scanning direction X. It is not necessary that the subsidiary tanks 80 and the heads 10 be arranged in the main scanning direction X. Further, it is not necessary that the subsidiary tanks 80 and the waste-liquid tank 99 overlap in the vertical direction Z.

It is not necessary that the cartridges 4 and the heads 10 be arranged in the sub-scanning direction Y. It is not necessary that the subsidiary tanks 80 overlap the waste-liquid tank 99 (the vertical section 99*b*) in the sub-scanning direction Y when the upper casing 1*a* and the lower casing 1*b* take the adjacent position. It is not necessary that the moving mechanism 75 and the waste-liquid tank 99 overlap each other in the vertical direction Z.

Some of the paper feed tray 20, the platens 44 and 45, the heads 10, and the paper discharging section 31 may overlap each other in the vertical direction Z, or it may be so configured that none of these components overlap each other in the vertical direction Z.

It is not necessary that the paper feed tray 20 and the waste-liquid tank 99 be arranged in the main scanning direction X. Further, it is not necessary that the supporting surface 31*a* of the paper discharging section 31 be slanted. It is not necessary that the path R1 and the cartridge mount sections 70 overlap each other in the vertical direction Z.

It is not necessary that the liquid conveying section 72 have the subsidiary tanks 80 and the pump 82. In this case, the cartridge mount sections 70 are so arranged that the inner liquid surface of the mounted cartridge 4 is within a predetermined level range that is lower than the ejection surface 10*a*.

Further, the liquid conveying section 72 may include only a pipe for connecting the cartridge 4 with the head 10. In this case, it is so configured that liquid is supplied from the cartridge 4 to the head 10 as liquid is ejected from the head 10.

Further, in a case where the subsidiary tanks 80 are not provided, liquid may be supplied from the cartridge 4 to the head 10 with a pump. Further, the liquid conveying section 72 need not have the moving mechanism 75. In this case, it may be so configured that a hollow needle is connected with the cartridge 4 when the cartridge 4 is mounted on the cartridge mount section 70.

Further, the liquid conveying section 72 need not have a hollow needle. The waste-liquid conveying section 97 need not have the pump 97*a*, and may only include the pipe 97*b*. In a case where the waste-liquid conveying section 97 does not have the pump 97*a*, gravity causes liquid to be conveyed from the waste-liquid tray 94 via the pipe 97*b* to the waste-liquid tank 99.

In the above-described embodiment, the platens 44 and 45 are described as an example of the supporting section that supports a recording medium. However, another configuration such as a conveying belt may be adopted as the supporting section.

The invention can be applied not only to a monochromatic printer but also to a color printer. The invention is not limited to a printer, but can be applied to a facsimile apparatus, a copier, and the like. The heads may eject any liquid other than ink and pretreatment liquid. The number of heads included in the liquid ejecting device may be one or greater than two. A recording medium is not limited to paper P, but may be any medium on which recording can be performed.

What is claimed is:

1. A printer comprising:

a platen configured to support a medium;

a head comprising an ejection surface at which an ejection port is opened, the ejection port configured to eject liquid toward the medium supported by the platen;

a first frame holding the platen;

a second frame holding the head, the second frame pivotally coupled with the first frame, the second frame configured to be moved between a first position and a second position, wherein when the second frame is at the first position, the head is configured to face the platen, wherein when the second frame is at the second position, the second frame is positioned farther away from the first frame than when the second frame is at the first position, and wherein when the second frame is at the second position, the head is positioned farther away from the platen than when the second frame is at the first position; and a head lifter held by the second frame, wherein when the second frame is at the first position, the head lifter configured to move the head with respect to the second frame between a printing position and a separate position, wherein when the head is at the printing position, the head is configured to eject liquid toward the medium supported by the platen, and wherein when the head is at the separate position, the head is farther away from the platen in an intersecting direction intersecting the ejection surface than when the head is at the printing position.

2. The printer according to claim 1, further comprising a casing including the first frame and the second frame, wherein a mount opening for mounting a cartridge is positioned farther downstream than the head in a discharge direction when viewed from the intersecting direction, the discharge direction being a direction in which the medium is discharged to an outside of the casing.

3. The printer according to claim 2, further comprising:

a waste-liquid tank which is configured to collect the liquid ejected from the head as a waste liquid; and a pipe through which the waste liquid is conveyed to the waste-liquid tank, the pipe being connected to an inlet of the waste-liquid tank, wherein the inlet of the waste-liquid tank is farther away from the mount opening than the head is in the discharge direction, and wherein the head and the waste-liquid tank do not overlap when viewed from the intersecting direction.

4. The printer according to claim 1, further comprising:

a waste-liquid tank which is configured to collect the liquid ejected from the head as a waste liquid; and a pipe through which the waste liquid is conveyed to the waste-liquid tank, the pipe being connected to an inlet of the waste-liquid tank, wherein the inlet of the waste-liquid tank is farther away from a mount opening than the head is in a conveyance direction, the mount opening being an opening for mounting a cartridge, the conveyance direction being a direction in which the medium supported by the platen is conveyed.

5. The printer according to claim 1, further comprising a wiper configured to wipe the ejection surface, wherein when the head is at the printing position, the wiper is farther away from the platen in the intersecting direction than the ejection surface is.

6. The printer according to claim 5, further comprising:

a wiper moving mechanism configured to move the wiper; and a controller configured to:

control the head lifter to position the head at the separate position; and control the wiper moving mechanism to move the wiper to wipe the ejection surface when the head is at the separate position.

7. The printer according to claim 6, further comprising a conveyance roller configured to convey the medium in a conveyance direction orthogonal to the intersecting direction, wherein the wiper moving mechanism comprises:

a wiper carriage on which the wiper is mounted, the wiper carriage configured to move in a width direction orthogonal to the conveyance direction and parallel to the ejection surface; and a guide extending in the width direction, the guide configured to guide the wiper carriage while the wiper carriage moves.

8. The printer according to claim 7, further comprising a shaft by which the second frame is coupled with the first frame so that the second frame moves relative to the first frame, the shaft being parallel to the width direction.

9. The printer according to claim 1, further comprising a waste-liquid tank holder disposed in the first frame, the waste-liquid tank holder configured to detachably hold a waste-liquid tank which is configured to collect the liquid ejected from the head as a waste liquid.

10. The printer according to claim 9, further comprising:

a pump configured to send the liquid toward the waste-liquid tank as the waste-liquid; and a pipe fluidly connected with the pump and the waste-liquid tank, wherein at least part of the pipe is held by the first frame.

11. The printer according to claim 1, wherein the platen comprises a conveyance belt configured to convey the medium.

* * * * *